(12) United States Patent
Wan et al.

(10) Patent No.: US 8,861,387 B2
(45) Date of Patent: Oct. 14, 2014

(54) METHOD, DEVICE AND USER EQUIPMENT FOR TRANSMITTING MULTI-CELL SCHEDULING INFORMATION

(75) Inventors: Lei Wan, Beijing (CN); Sha Ma, Beijing (CN); Mingyu Zhou, Beijing (CN); Jingyuan Sun, Beijing (CN); Chengyu Wang, Beijing (CN); Di Zhu, Beijing (CN); Yuan Xia, Beijing (CN); Xiaotao Ren, Beijing (CN); Shujun Dang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 325 days.

(21) Appl. No.: 13/052,961

(22) Filed: Mar. 21, 2011

(65) Prior Publication Data

US 2011/0182200 A1 Jul. 28, 2011

Related U.S. Application Data

(63) Continuation of application No. PCT/CN2009/074113, filed on Sep. 22, 2009.

(30) Foreign Application Priority Data

Sep. 22, 2008 (CN) .......................... 2008 1 0216306
May 13, 2009 (CN) .......................... 2009 1 0203029

(51) Int. Cl.
*H04L 12/26* (2006.01)
*H04W 72/12* (2009.01)
*H04W 52/02* (2009.01)

(52) U.S. Cl.
CPC ...... *H04W 72/1289* (2013.01); *H04W 52/0216* (2013.01)
USPC .......................................................... 370/252

(58) Field of Classification Search
None
See application file for complete search history.

(56) References Cited

U.S. PATENT DOCUMENTS

| 5,546,443 | A | 8/1996 | Raith |
| 6,349,091 | B1 | 2/2002 | Li |
| 8,412,209 | B2 * | 4/2013 | Whinnett et al. ............ 455/450 |
| 2006/0007889 | A1 | 1/2006 | Khan |
| 2006/0126646 | A1 | 6/2006 | Bedingfield, Sr. |
| 2006/0146745 | A1 | 7/2006 | Cai et al. |
| 2007/0293234 | A1 | 12/2007 | Kim et al. |

(Continued)

FOREIGN PATENT DOCUMENTS

| CN | 1399432 A | 2/2003 |
| CN | 1719940 A | 1/2006 |

(Continued)

OTHER PUBLICATIONS

Korean Intellectual Property Office Notice to Submit a Response received in Korean Application No. 10-2011-7007462, 6 pages.

(Continued)

*Primary Examiner* — Minh-Trang Nguyen
(74) *Attorney, Agent, or Firm* — Slater & Matsil, L.L.P.

(57) ABSTRACT

A method, device and user equipment (UE) for transmitting multi-cell scheduling information is provided. When at least two cells are serving the UE, the method for transmitting multi-cell scheduling information includes the following steps: determining a main cell of the UE from the at least two cells; transmitting, in the main cell, the scheduling information of the main cell and an auxiliary cell which are serving the UE.

23 Claims, 5 Drawing Sheets

(56) References Cited

U.S. PATENT DOCUMENTS

| | | | |
|---|---|---|---|
| 2008/0014958 A1* | 1/2008 | Kim et al. | 455/452.2 |
| 2009/0116418 A1 | 5/2009 | Lee et al. | |
| 2011/0182200 A1 | 7/2011 | Wan et al. | |

FOREIGN PATENT DOCUMENTS

| | | |
|---|---|---|
| CN | 1819481 A | 8/2006 |
| CN | 1943138 A | 4/2007 |
| CN | 101064679 A | 10/2007 |
| CN | 101064903 A | 10/2007 |
| CN | 101064945 A | 10/2007 |
| CN | 101080081 A | 11/2007 |
| CN | 101171855 A | 4/2008 |
| EP | 1615460 A1 | 1/2006 |
| EP | 1874075 A2 | 1/2008 |
| GB | 2318256 A | 4/1998 |
| WO | WO 2007/084047 A1 | 7/2007 |
| WO | WO 2010/031362 A1 | 3/2010 |

OTHER PUBLICATIONS

Second Chinese Office Action of Chinese Application No. 200910203029.9 mailed Aug. 2, 2012, 9 pages.
Written Opinion of the International Searching Authority received in International Application No. PCT/CN2009/074113, mailed Dec. 31, 2009, 4 pages.
International Search Report, PCT/CN2009/074113, dated Dec. 31, 2009, 4 pages.
3GPP TR 25.848 V4.0.0, $3^{rd}$ Generation Partnership Project; Technical Specification Group Radio Access Network; Physical Layer Aspects of UTRA High Speed Downlink Packet Access (Release 4), dated Mar. 2001, 89 pages.
3GPP TS 25.331 V8.4.0, $3^{rd}$ Generation Partnership Project; Technical Specification Group Radio Access Network; Radio Resource Control (RRC); Protocol Specification (Release 8), dated Sep. 2008, 1,543 pages.
3GPP TSG RAN WG1 Meeting #54, Text Proposal for RAN1 TR on LTE-Advanced, R1-083410, dated Aug. 18-22, 2008, 3 pages.
Extended European Search Report regarding International Patent Application No. 09814082, dated Jul. 19, 2012, 8 pages.
Third Chinese Office Action of Chinese Application No. 200910203029.9 mailed Mar. 5, 2013, 9 pages. (Partial Translation).
Extended European Search Report received in Application No. 13186565.1-1858 mailed Oct. 24, 2013, 5 pages.

* cited by examiner

A) Transmission on downlink data channel

B) Transmission on downlink control channel

C) Transmission on uplink control channel

METHOD, DEVICE AND USER EQUIPMENT FOR TRANSMITTING MULTI-CELL SCHEDULING INFORMATION

This application is a continuation of co-pending International Application No. PCT/CN2009/074113, filed Sep. 22, 2009, which designated the United States and was not published in English, and which claims priority to Chinese Application No. 200810216306.5, filed Sep. 22, 2008, and Chinese Application No. 200910203029.9, filed May 13, 2009, each of which is incorporated herein by reference.

TECHNICAL FIELD

The present invention relates to the field of wireless communication technology, and more particularly, to a method, device and user equipment for transmitting multi-cell scheduling information.

BACKGROUND

In Beyond 3rd Generation/4th Generation (B3G/4G) wireless communication systems, the coordinated multi-point transmission (CoMP) technology has become an important direction in improving the overall cell performance and the performance of the edge users of the cell. In a CoMP system, a network node includes an Evolved NodeB (eNB) and an Access point (AP). Each eNB manages one or more cells, and one or more APs may scatter in each cell in a centralized or distributed form. The eNB establishes a connection with User Equipment (UE), manages the UE, and communicates with the UE through the AP.

In the CoMP system, one UE may be served by multiple cells at the same time; these cells may be managed by the same eNB, or may be managed by different eNBs. These cells are classified into main cells (serving cell) and auxiliary cells (cooperative cell), the main cells provide basic services and centralized services for the UE, and the auxiliary cells provide enhanced services and distributed services for the UE.

The fading conditions for the wireless transmission channels from the network nodes to the UE in different cells are independent from one another. In order to achieve larger scheduling gain, the system allocates the frequency resources and adjusts the links adaptively according to the frequency selection of the wireless channels, thus producing, for each cell, dedicated scheduling information specific to the cell. The scheduling information of the multiple cells serving the UE all needs to be sent to the UE. Upon the receipt of the scheduling information, the UE sends or receives data on specified wireless resources according to the information, thereby accomplishing the communication with the eNB. The scheduling information all needs to be transmitted to the UE through a downlink control channel.

However, in existing systems, when one cell is serving the UE, the cell has to send its scheduling information to the UE through its own downlink control channel. The downlink control channel only comprises therein the scheduling information for the cell, without the scheduling information for neighboring cells. However, when multiple cells are serving one UE, the differences between the channel conditions from the APs in the cells to the UE determine the parameter setting and transmission quality of the downlink control channels from the cells to the UE. When the channel condition is relatively poor, it is desired to use more wireless resources, such as frequency band, time slot, and power, to obtain a certain satisfying receiving effect, thus resulting in a reduction of resource efficiency.

SUMMARY OF THE INVENTION

The present invention is directed to a method, device and user equipment for transmitting scheduling information, in which, in a main cell the UE is notified of the scheduling information of multiple cells for the UE, so the utilization efficiency of the system radio resources is increased.

In an embodiment of the present invention, a method for transmitting multi-cell scheduling information is provided. When at least two cells are serving a UE, the method includes the following steps: determining a main cell of the UE from the at least two cells; and transmitting, in the main cell, scheduling information of the main cell and an auxiliary cell that are serving the UE.

In an embodiment of the present invention, communication equipment is provided, which is communicated with a UE served by at least two cells, and the communication equipment includes: a first processing module, configured to determine a main cell of the user equipment from the at least two cells; and a first transmission module, configured to transmit, in the main cell, scheduling information of the main cell and an auxiliary cell that are serving the user equipment determined by the first processing module.

In an embodiment of the present invention, a UE is provided. When at least two cells are serving the UE, the UE includes: a first receiving module, configured to receive, in a main cell, scheduling information of the main cell and an auxiliary cell; and a transmission module, configured to transmit data and/or signaling in data and/or control channels of the main cell and the auxiliary cell according to the scheduling information received by the receiving module.

In the technical solutions provided in the embodiments of the present invention, it is in the main cell that the UE is notified about the scheduling information of multiple cells for the UE, so the utilization efficiency of the system radio resources is increased. At the same time, the UE can only detect a control channel from the main cell, thus saving the detection time and power for the control signaling.

DETAILED DESCRIPTION OF ILLUSTRATIVE EMBODIMENTS

Inventors of the present invention discovered that, when multiple cells are serving a UE, it will consume much more wireless resources if all the scheduling information of every cell is transmitted through downlink control channels of the cell. At the same time, when the channel conditions from APs in some cells to the UE are poor, the transmission on the downlink control channels of these cells also needs much more wireless resources, resulting in a reduction of the resource utilization efficiency.

Figure 1:
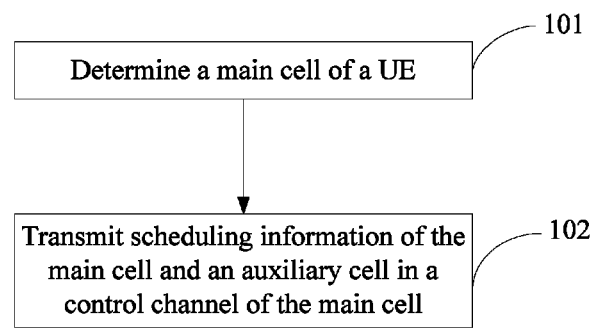
FIG. 1 is a first flow chart of a method for transmitting scheduling information according to an embodiment of the present invention.

FIG. 1 shows a flow chart of a method for transmitting scheduling information according to an embodiment of the present invention. When at least two cells are serving a UE, the method includes the following specific processes.

In step 101, a main cell of the UE is determined from the at least two cells.

When determining the main cell of the UE, the main cell may be determined according to the Reference Signal Receiving Power (RSRP) of each cell, for example, the cell with the strongest RSRP is selected as the main cell. The RSRP may be reported to an eNodeB thorough the UE.

In step 102, scheduling information of the main cell and an auxiliary cell that are serving the UE is transmitted in the main cell.

The transmission of the scheduling information in the main cell may be an implicit transmission through control channel/ higher layer signaling or other means. The control channel may be a Physical Downlink Control Channel (PDCCH).

In the method for transmitting scheduling information according to the embodiment of the present invention, it is in the main cell that the UE is notified about the scheduling information of at least two cells for the UE, so the utilization efficiency of the system radio resources is increased. At the same time, the UE can only detect a control channel from the main cell, thus saving the detection time and power for the control signaling.

Figure 2:
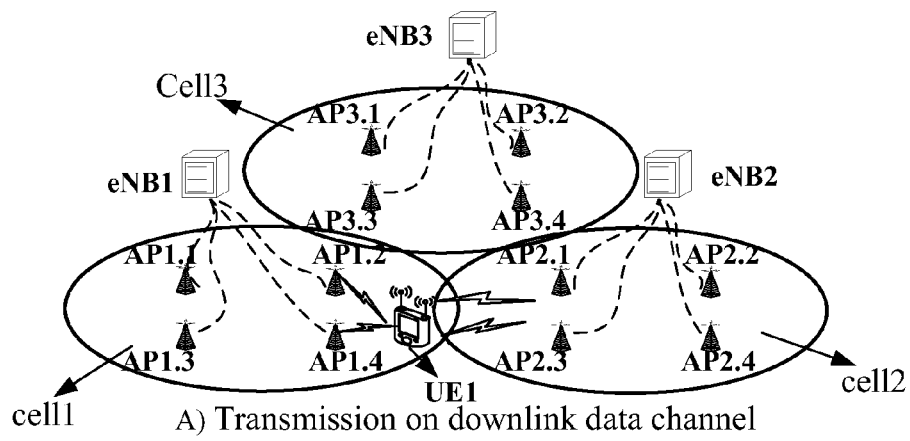
FIG. 2 is a schematic view of transmitting scheduling information according to an embodiment of the present invention.
Figure 2:
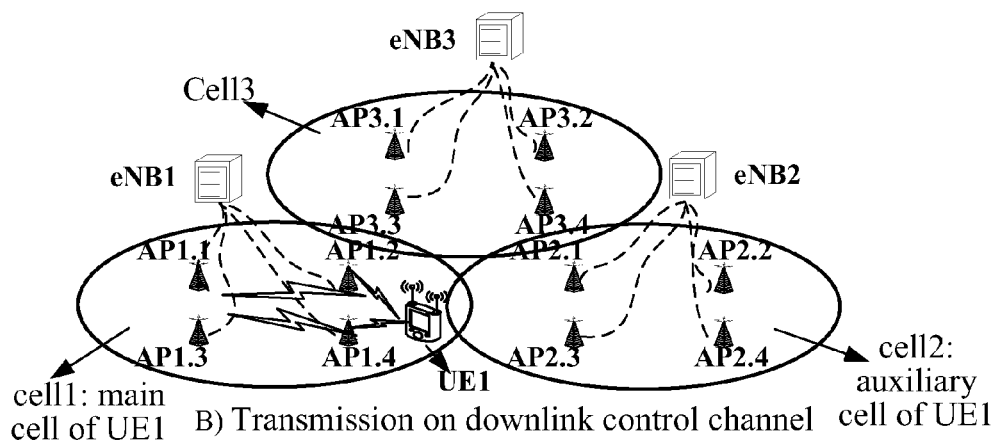
Figure 2:
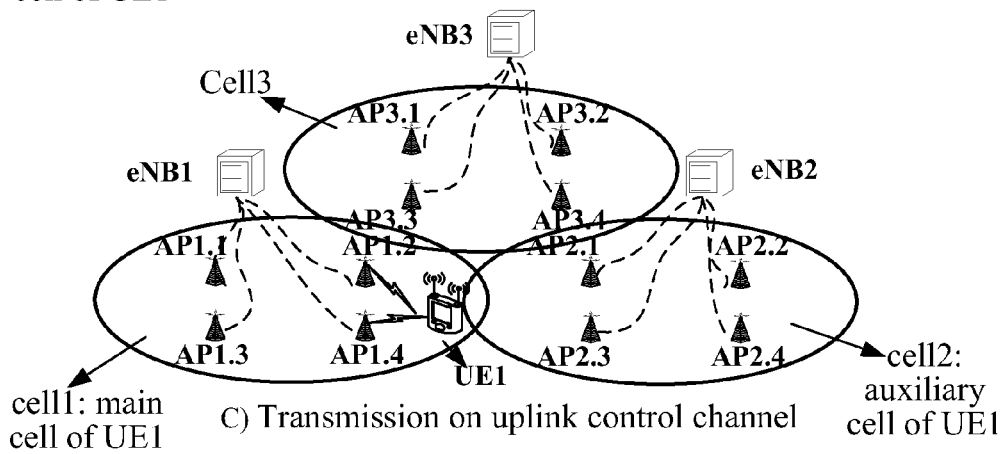

FIG. 2 shows a schematic view of transmitting multi-cell scheduling information according to an embodiment of the present invention. For a UE1 in FIG. 2(B), a cell1 and a cell2 serve the UE1. The cell1 is the main cell, and corresponds to an eNB1. The cell2 is the auxiliary cell, and corresponds to an eNB2. The scheduling information of the cell1 and the cell2 is transmitted to the UE1 through a downlink control channel of the cell1.

Figure 3:
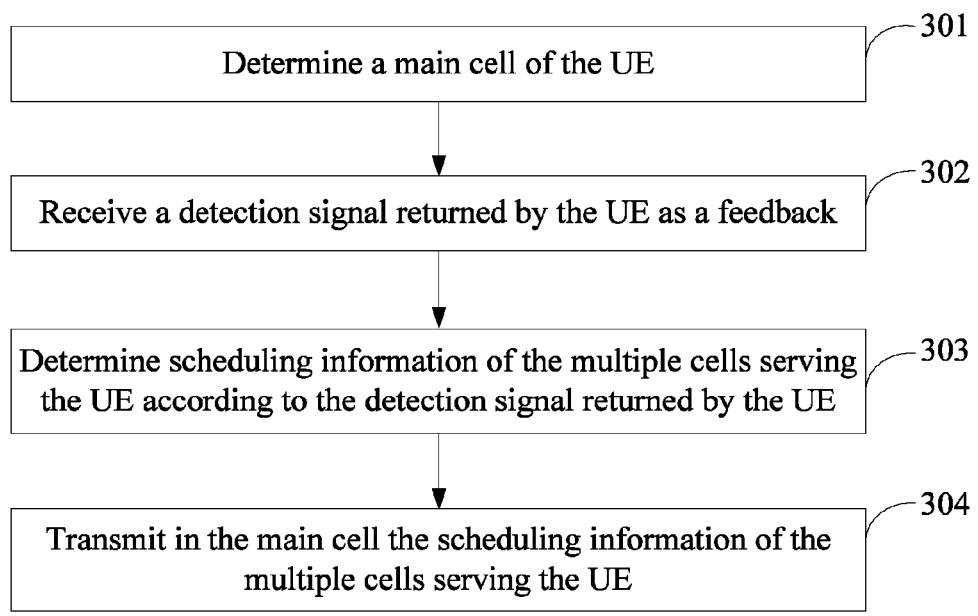
FIG. 3 is a second flow chart of a method for transmitting scheduling information according to the embodiment of the present invention.

FIG. 3 shows a flow chart of a method for transmitting multi-cell scheduling information according to an embodiment of the present invention. When multiple cells are serving a UE, the method includes the following specific processes.

In step 301, a main cell is determined for the UE.

The UE selects a number of cells during cell searching, and returns the selected cell IDs and corresponding RSRPs to an eNB as a feedback. The eNB then selects a cell with the strongest RSRP as the main cell according to the RSRPs.

In step 302, a detection signal returned by the UE as a feedback is received.

The detection signal may be a Sounding Reference Signal (SRS), and the UE sends the detection signal according to the instruction of the eNB. The detection information may include time, frequency, ID of corresponding probing cell, codeword and/or transmission power.

In step 303, the scheduling information of the multiple cells serving the UE is determined according to the detection signal returned by the UE.

In step 304, the scheduling information of the multiple cells serving the UE is transmitted in the main cell.

The scheduling information may include a set of monitored cells.

The eNB notifies the UE of an ID set of cells that need to be monitored by the UE in the main cell through signaling, such that the UE monitors channel quality of various cells corresponding to the cell ID set. The cell ID set may be a subset of the set of cells whose RSRPs are measured. For example, in FIG. 2, the cell ID set may include the cell1, the cell2 and the cell3, and the signaling is the set {cell1, cell2, cell3}. Assuming that {cell1, cell2, cell3, cell4} (in which the cell4 is not shown in FIG. 2) is the set of cells whose RSRPs are measured, and the set of cells whose RSRPs are measured is used for switching; therefore, the cell ID set comprised in the signaling is a subset of the set of cells whose RSRPs are measured. The signaling may transmit its content implicitly through control channel/higher layer signaling or other means.

The UE monitors the channel quality of various cells corresponding to the cell ID set, for example, Channel Quality Indicator (CQI), Precoding Matrix Indicator (PMI), Rank Indicator (RI), and so on. The UE can report to the eNB the channel quality of all the cells corresponding to the ID set of the monitored cells or of partial cells corresponding to the ID set of the monitored cells, for being used in the selection of dynamic service cells for the data and/or control channels and the selection of APs in each dynamic service cell.

Further, the eNB receives the CQI, PMI, RI, etc., of all or partial cells corresponding to the ID set of monitored cells reported by the UE, determines the dynamic service cells for the data and/or control channels according to the received CQI, PMI or RI of all or partial cells corresponding to the ID set of monitored cells, in which the determined dynamic service cells for the data and/or control channels may be all or partial cells corresponding to the ID set of monitored cells reported to the eNB by the UE.

Alternatively, the eNB may not deliver the ID set of cells that need to be monitored by the UE, but rather the UE monitors the channel quality of the cells corresponding to the cell IDs selected by the UE in step 301, and the UE may report the channel quality of all or partial cells corresponding to the cell IDs selected by the UE.

In addition, the scheduling information may further include the information about the dynamic service cell for the data channel, the information about the dynamic service cell for the control channel, information about AP selection in each dynamic service cell, information about multi-cell collaboration schemes and/or information about scheduling allocation etc.

The dynamic service cells for the data and/or control channels may include the number and IDs of the auxiliary cells being used in the transmission on the data and/or control channels, and may further include the frequency offset of the reference signals in each dynamic service cell. Upon the receipt of the frequency offset information, the UE may acquire the information about the reference signals of the main cell and/or auxiliary cell at correct frequency positions according to the frequency offset information. For example, in FIG. 2(A), the auxiliary cell used for transmitting the data channel is the cell2, so the signaling transfers therein that the number of the auxiliary cell used for transmitting the data channel is 1, and the ID of the auxiliary cell is the ID of cell2.

For the data channel and control channel, the APs selected in different dynamic service cells include main cells and auxiliary cells. For example, in FIG. 2(A), for data channel, the APs selected by the main cell (cell1) are AP1.2 and AP1.4, the APs selected by the auxiliary cell (cell2) are AP2.1 and AP2.3, and thus the signaling transfers therein that, in the data channel, the APs in the main cell serving the UE include AP1.2 and AP1.4, the APs in the auxiliary cell serving the UE include AP2.1 and AP2.3; or transfers that the APs serving the UE include AP1.2, AP1.4, AP2.1, AP2.3. In FIG. 2(B), for the control channel, the APs selected are AP1.1, AP1.2, AP1.3, AP1.4, and the signaling transfers therein that the APs serving the UE in the control channel include AP1.1, AP1.2, AP1.3, AP1.4.

Multiple cell collaboration schemes include fast switching scheme, combined transmit diversity scheme, combined transmit-receive scheme, spatial multiplex scheme, cooperative interference management scheme and son on. For example, for FIG. 2, the cell collaboration scheme is a multi-cell coordination mode of cell1 and cell2. For the fast switching scheme, it only needs scheduling/link adaptation/pre-encoding in the main cell; for the combined transmit diversity scheme, one set of scheduling/link adaptation is used for all serving cells; for the spatial multiplex scheme, the resource scheduling allocation may be the same or different for different serving cells, and in addition, the link adaptation, pre-encoding/Beamforming, etc., are also required in each serving cell.

The scheduling allocation information may indicate resources adopted in transmitting data or signaling in the data and/or control channels of multiple cells. Also, it is allowed to allocate different frequency resources for data and/or control channels in different cells. Meanwhile, the same or different transmission formats may be adopted, or different transmission weights are used, and so on. For example, the scheduling allocation information may include therein an indication of the resources adopted in transmitting uplink control signals in the main cells and/or auxiliary cells, the indication of the adopted resources includes the time, frequency, codeword resource and/or transmission power of the adopted resources. The UE transmits the uplink control signals according to the instruction of the eNB, the uplink transmit control signals may include time, frequency, cell ID, codeword resource and/or transmission power etc.

The spatial multiplex indication may further include the resource allocation adopted by the selected APs in the main cell, for example, in FIG. 2(A), the resource allocation adopted by AP1.2 and AP1.4; the resource allocation adopted by the selected APs in the auxiliary cell, for example, the resource allocation adopted by AP2.1 and AP2.3; and the PMI, CQI, RI or transmission power in the auxiliary cell.

Optionally, "the resource allocation adopted by the selected APs in the main cell" and "the resource allocation adopted by the selected APs in the auxiliary cell" are co-encoded or transmitted after compression, the two resource allocations may be the same or different; optionally, the indication of spatial multiplex may also include therein an indication that "whether the serving cells adopt the same resource allocation" and "the resource allocation adopted by the selected APs in the auxiliary cell". For example, in FIG. 2(A), the resource allocation adopted by AP1.2 and AP1.4 and the resource allocation adopted by AP2.1 and AP2.3 are co-encoded or transmitted after compression, the two resource allocations may be the same or different; optionally, the signaling may include therein an indication that "whether the cell1 and cell2 adopt the same resource allocation" and "the resource allocation adopted by AP2.1 and AP2.3".

The method further includes that the eNB notifies the UE through the signaling to measure the number of the antenna ports in the auxiliary cell based on the Physical Broadcast Channel (PBCH) or other manners. For instance, in FIG. 2, the UE1 may measure the number of the antenna ports in cell2 based on the PBCH. Meanwhile, the spatial multiplex scheme information may further include an indication of a multi-antenna mode in the auxiliary cell, for example, in FIG. 2(A), may include the multi-antenna mode adopted by the cell2. The multi-antenna transmission modes for each cell may include, for example, transmit diversity or spatial multiplex, pre-encoding or beamforming mode.

At the same time, for each cell, at least the eNB needs a mapping that can be saved as a table, and can be notified to the UE or other communication equipments through an air interface, an X2 interface, or an S1 interface.

For downlink measuring/transmission, specific mappings of the cell include a mapping from AP ID to cell ID, for example, in FIG. 2, mappings from AP1.1, AP1.2, AP1.3, AP1.4 to the ID of cell1 are needed, and mappings from AP2.1, AP2.2, AP2.3, AP2.4 to the ID of cell2 are needed; and a mapping from AP ID to a common reference signal, for example, in FIG. 1, mappings from AP1.1, AP1.2, AP1.3, AP1.4 to the common reference signal of the cell1 are needed and mappings from AP2.1, AP2.2, AP2.3, AP2.4 to the common reference signal of the cell2 are needed.

For the AP selection of each UE, specific mappings for the UE include: in the main cell, the mapping from the AP ID for transmitting control channel to the UE, for example, in FIG. 2, the APs serving the UE in the control channel include AP1.1, AP1.2, AP1.3, AP1.4, so the mappings from AP1.1, AP1.2, AP1.3, AP1.4 to the UE1 are needed; in each serving cell, the mapping from the AP ID for transmitting data channel to the UE, for example, in FIG. 2, the APs serving the UE in the data channel include AP1.2, AP1.4, AP2.1, AP2.3, so the mappings from AP1.2, AP1.4, AP2.1, AP2.3 to the UE1 are needed; the mapping from the AP ID for transmitting PUSCH to the UE, for example, in FIG. 2, the APs receiving the signals from the UE in the PUSCH include AP1.2 and, AP1.4, so the mappings from the AP1.2, AP1.4 to the UE1 are needed.

According to the mapping table described above, the UE acquires from the PDCCH the AP ID for transmitting downlink control channel, the AP ID of each dynamic service cell for transmitting downlink data channel, and the AP ID for transmitting uplink data channel, and then the UE can acquire signals from the above-mentioned APs.

In the embodiments of the present invention, when multiple cells support the transmission of a UE at the same time, the scheduling information is sent only in the main cell, thus increasing the utilization efficiency of the system resources. Moreover, the UE may only detect the control channel from the main cell, which can save the detection time and power of the control signaling. In addition, the scheduling information includes the multi-cell collaboration scheme, the UE is notified to adopt coordinated interference management and combined transmit-receive, support such modes as fast cell selection, combined transmit diversity, and spatial multiplex, and further support joint scheduling between cells having different antenna configuration, applying different multi-antenna schemes make it more flexible the joint scheduling of multiple cells. At the same time, different frequency resources are allowed to use in different cells for data transmission of a single user, thus maximizing the multi-user scheduling gain of the CoMP system.

Figure 4:
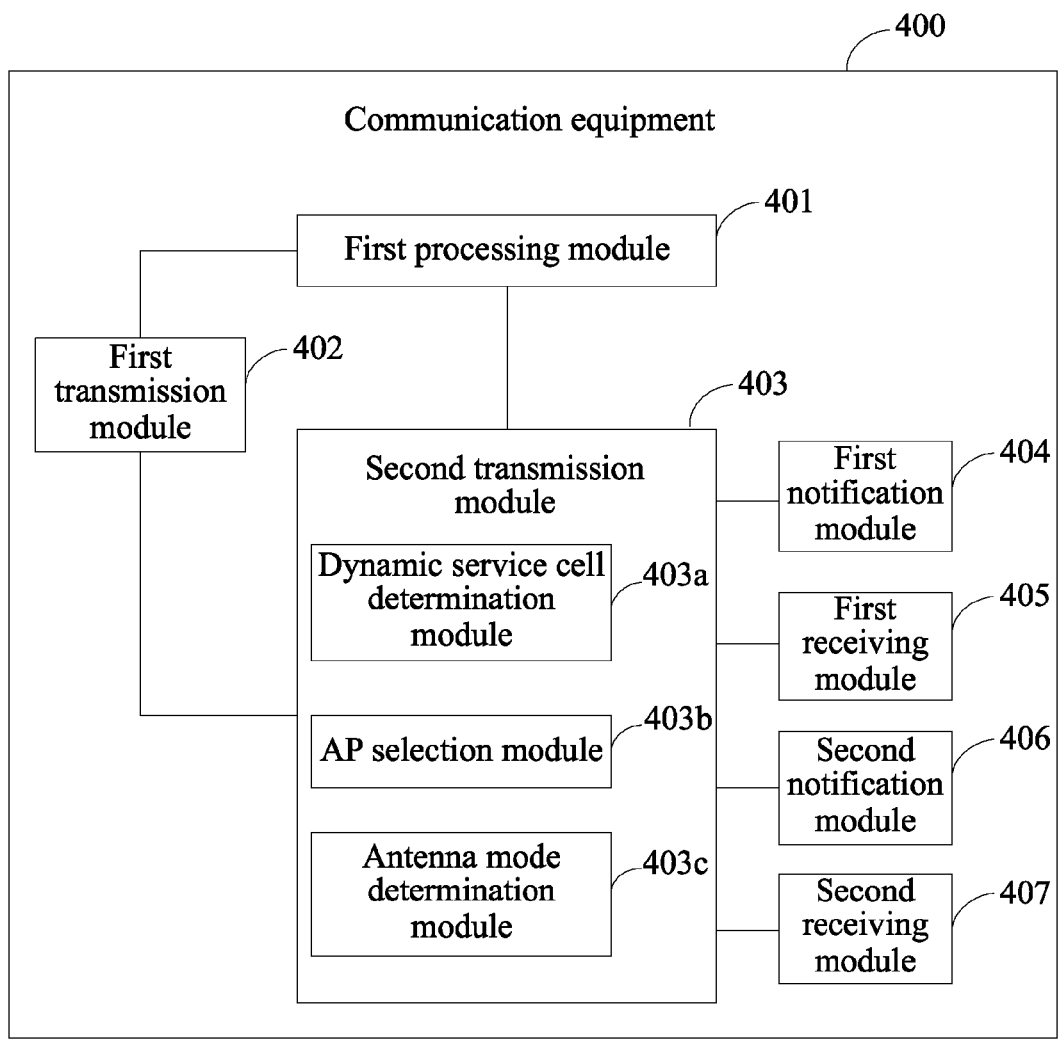
FIG. 4 is a schematic view of a base station according to an embodiment of the present invention.

Communication equipment 400 is provided in an embodiment of the present invention, as shown in FIG. 4, which is, communicated with a UE served by at least two cells. The communication equipment includes: a first processing module 401, configured to determine a main cell of the UE from the at least two cells; and a first transmission module 402, configured to transmit, in the main cell, scheduling information of the multiple cells serving the UE determined by the first processing module 401.

The embodiment of the present invention may further include a second processing module 403, configured to determine the scheduling information of the main cell and an auxiliary cell that are serving the UE.

The communication equipment may be used to perform the method for transmitting scheduling information according to the embodiments of the present invention shown in FIGS. 1, 2, and 3 described above. The scheduling information may include any scheduling information in the above method embodiments.

The embodiment of the present invention may further include a first notification module 404, configured to notify the UE of a cell ID set of cells that need to be monitored; and a first receiving module 405, configured to receive channel quality of all or partial cells corresponding to the cell ID set returned by the UE. Meanwhile, the second processing module further includes a dynamic service cell determination module 403a, configured to determine dynamic service cells for data and/or control channels for the UE according to the channel quality received by the receiving module; and an AP selection module 403b, configured to select APs of the dynamic service cells according to the channel quality received by the first receiving module.

The embodiment of the present invention may further include a second notification module 406, configured to instruct the UE to measure the number of antenna ports in the auxiliary cell; and a second receiving module 407, configured to receive the number of the antenna ports in the auxiliary cell returned by the UE. Meanwhile, the second processing module further includes an antenna mode determination module 403c, configured to determine a multi-antenna mode of the auxiliary cell according to the number of the antenna ports in the auxiliary cell received by the second receiving module.

The transmission module 402, the first notification module 404, and the notification module 406 may or may not be detached physically, and may be located on the same entity or distributed onto several network entities. When located on the same network entity, the transmission module 402, the first notification module 404, and the notification module 406 may be comprised in a transceiving unit Likewise, the first receiving module 405 and the second receiving module 407 may or may not be detached physically, and may be located on the same entity or distributed onto several network entities. When located on the same network entity, the first receiving module 405 and the second receiving module 407 may be comprised in a transceiving unit. Meanwhile, the transmission module 402, the first notification module 404, the notification module 406, the first receiving module 405, and the second receiving module 407 may also be located on the same network entity, and may be comprised in a transceiving unit.

The embodiment of the present invention may further include a storage configured to save the mapping from AP ID to cell ID, the mapping from AP ID to common reference signal, the mapping from AP ID for transmitting control channel to the UE and/or the mapping from AP ID for transmitting data channel to the UE and/or the mapping from AP ID for transmitting PUSCH to the UE.

It should be understood that, what is shown in the accompanying drawings or the embodiments is only schematic and represents logic structures, the modules shown as separate parts may or may not be detached physically, the parts shown as modules may or may not be physical units, that is, they may be located on the same place, or distributed onto several network entities.

Figure 5:
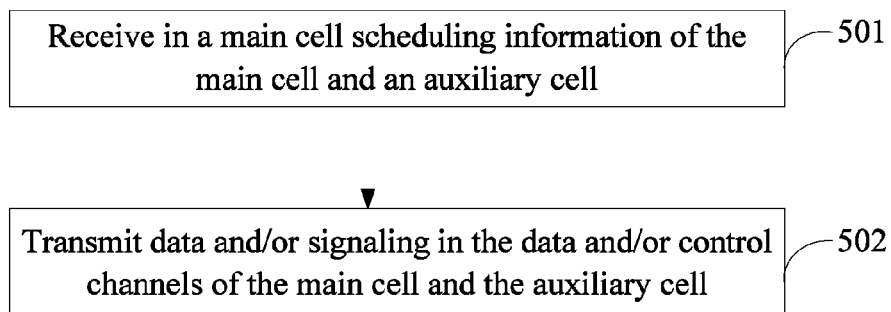
FIG. 5 is a flow chart of a communication method according to an embodiment of the present invention.

A communication method is provided in an embodiment of the present invention, as shown in FIG. 5. When at least two cells are serving a UE, the method includes the following specific processes.

In step 501, scheduling information of a main cell and an auxiliary cell is received in the main cell.

In step 502, data and/or signaling are transmitted in data and/or control channels of the main cell and the auxiliary cell according to the scheduling information.

The frequency resources of the data and/or control channels of the at least two cells may be the same or different, meanwhile, the same or different transmission formats may be adopted, or different transmission weights may be used, and so on.

The method further includes that the UE receives a cell ID set of cells that need to be monitored, monitors channel quality of various cells corresponding to the cell ID set, and returns the channel quality of all or partial cells corresponding to the cell ID set as a feedback. Receiving the scheduling information of multiple cells in the main cell is receiving the scheduling information of the multiple cells determined according to the channel quality of all or partial cells corresponding to the cell ID set. The scheduling information includes information about dynamic service cells for data and/or control channels, information about AP selection in each serving cell, information about multi-cell collaboration scheme and information about scheduling allocation, PMI, CQI, RI, transmission power, and the like. The dynamic service cells for data and/or control channels may include the number and IDs of the auxiliary cells for transmitting the data and/or control channels. For data channel and control channels, the APs selected in different cells include main cells and auxiliary cells. Multi-cell collaboration schemes include fast switching scheme, combined transmit diversity scheme, combined transmit receive scheme, spatial multiplex scheme, cooperative interference management scheme, and so on.

The method further includes that the UE receives a notification, and measures the number of the antenna ports in the auxiliary cell based on a broadcast channel, for example, PBCH, or other manners. The number of the antenna ports in the auxiliary cell is then reported. The spatial multiplex indication in the scheduling information may include a multi-antenna transmission mode of the auxiliary cell determined according to the number of the antenna ports in the auxiliary cell.

For each cell, at least the eNB may save a mapping that can be saved as a table, and the mapping table can be received by the UE or other communication equipments through an air interface, an X2 interface, or an S1 interface from the eNB.

For downlink measuring/transmission, specific mappings of the cell include the mapping from AP ID to cell ID, for example, in FIG. 2, mappings from AP1.1, AP1.2, AP1.3, AP1.4 to the ID of the cell1 is needed, the mappings from AP2.1, AP2.2, AP2.3, AP2.4 to the ID of the cell2 are needed; and the mapping from AP ID to a common reference signal, for example, in FIG. 1, mappings from AP1.1, AP1.2, AP1.3, AP1.4 to the common reference signal of the cell1 are needed and mappings from AP2.1, AP2.2, AP2.3, AP2.4 to the common reference signal of the cell2 are needed.

For the AP selection of each UE, specific mappings of the UE include: in the main cell, the mapping from the AP ID for transmitting control channel to the UE, for example, in FIG. 2, the APs serving the UE in the control channel include AP1.1, AP1.2, AP1.3, AP1.4, so the mappings from AP1.1, AP1.2, AP1.3, AP1.4 to the UE1 are needed; in each serving cell, the mapping from the AP ID for transmitting data channel to the UE, for example, in FIG. 2, the APs serving the UE in the data channel include AP1.2, AP1.4, AP2.1, AP2.3, so the mappings from AP1.2, AP1.4, AP2.1, AP2.3 to the UE1 are needed; the mapping from the AP ID for transmitting PUSCH to the UE, for example, in FIG. 2, the APs receiving the signals from the UE in the PUSCH include AP1.2 and, AP1.4, so the mappings from the AP1.2, AP1.4 to the UE1 are needed.

According to the mapping table described above, the UE acquires from the PDCCH the AP ID for transmitting downlink control channel, the AP ID of each dynamic service cell for transmitting downlink data channel, and the AP ID for transmitting uplink data channel, and then the UE can acquire signals from the above-mentioned APs.

In the embodiments of the present invention, when multiple cells support the transmission of a UE at the same time, the scheduling information is sent only in the main cell, the UE may only detect the control channel from the main cell, which can save the detection time and power of the control signaling. At the same time, different frequency resources are allowed to use in different cells for data transmission of a single user, thus maximizing the multi-user scheduling gain of the CoMP system.

Figure 6:
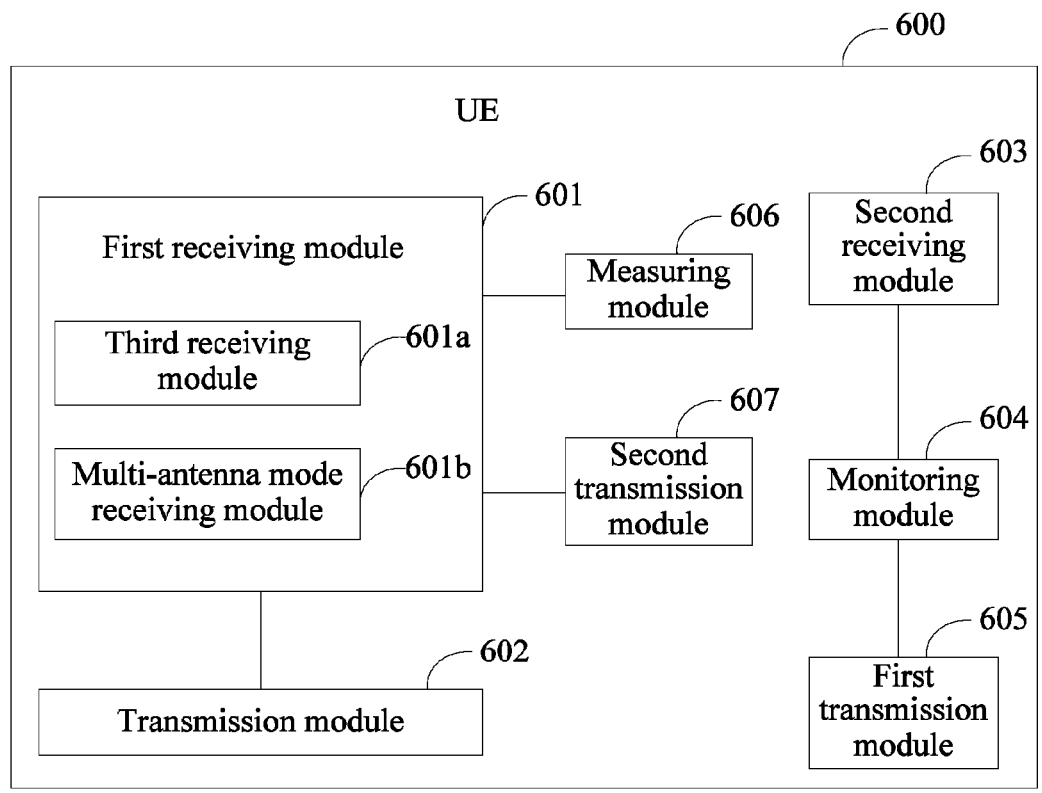
FIG. 6 is a schematic view of a UE according to an embodiment of the present invention.

The embodiments of the present invention provide a UE 600. As shown in FIG. 6, when at least two cells are serving the UE, the UE includes: a first receiving module 601, configured to receive, in a main cell, scheduling information of the main cell and an auxiliary cell; and a transmission module 602, configured to transmit data and/or signaling in data and/or control channels of the main cell and the auxiliary cell according to the scheduling information received by the receiving module.

The communication equipment may be used to perform the method for transmitting scheduling information according to the embodiment of the present invention shown in FIG. 5 described above. The scheduling information may include any scheduling information in the above method embodiments.

The embodiment of the present invention may further include: a second receiving module 603, configured to receive a cell ID set of cells that need to be monitored; a monitoring module 604, configured to monitor channel quality of various cells corresponding to the cell ID set; and a first transmission module 605, configured to return the channel quality of all or partial cells corresponding to the cell ID set as a feedback. The first receiving module is adapted specifically to receive in the main cell the scheduling information of the multiple cells determined according to the channel quality of all or partial cells corresponding to the received cell ID set.

The first receiving module 601 may further include: a third receiving module 601 a, configured to receive an notification to measure the number of antenna ports in the auxiliary cell; a measuring module 606, configured to measure the number of the antenna ports in the auxiliary cell; and a second transmission module 607, configured to report the number of the antenna ports in the auxiliary cell. The first receiving module further includes a multi-antenna mode receiving module 601b, configured to receive a multi-antenna transmission mode of the auxiliary cell determined according to the data of the antenna ports in the auxiliary cell reported by the second transmission module.

It should be understood that, what is shown in the accompanying drawings or the embodiments is only schematic and represents logic structures, the modules shown as separate parts may or may not be detached physically, the parts shown as modules may or may not be physical units, that is, they may be located on the same place, or distributed onto several network entities.

The first receiving module 601 and the second receiving module 603 may or may not be detached physically, and may be located on the same entity or distributed onto several network entities. When located on the same network entity, the first receiving module 601 and the second receiving module 603 may be comprised in a transceiving unit. Likewise, the transmission module 602, the first transmission module 605, and the second transmission module 607 may or may not be detached physically, and may be located on the same entity or distributed onto several network entities. When located on the same network entity, the transmission module 602, the first transmission module 605, and the second transmission module 607 may be comprised in a transceiving unit.

The technical resolution provided by the embodiments of the present invention may also be applied to a relay system of Orthogonal Frequency Division Multiplexing (OFDM), in which it only needs to replace the APs with relay stations. Generally speaking, the connection between an eNB and an AP is a physical connection, however, in a relay system, the connection between an eNB and a relay is a wireless connection.

Persons of ordinary skill in the art may understand that all or part of the steps of the method according to the embodiments of the present invention may be implemented by a program instructing relevant hardware. The program may be stored in a computer readable storage medium. The storage medium may be a magnetic disk, a Compact Disk Read-Only Memory (CD-ROM), or a Read-Only Memory (ROM).

It is apparent that those skilled in the art can make various modifications and variations to the present invention without departing from the spirit and scope of the present invention. The invention is intended to cover the modifications and variations provided that they fall in the scope of protection defined by the appended claims or their equivalents.

What is claimed is:

1. A method for transmitting multi-cell scheduling information, when at least two cells are serving a user equipment (UE), the method comprising:
   determining, by an Evolved NodeB (eNB), a main cell of the UE from the at least two cells; and
   transmitting by the eNB, in the main cell, scheduling information of the main cell and an auxiliary cell that are serving the UE, to the UE, wherein the scheduling information comprises information about scheduling allocation, and the information about scheduling allocation includes an indication of resources adopted by the UE to send uplink control signals in the main cell and the auxiliary cell.

2. The method according to claim 1, wherein scheduling information further comprises any one or any combination of: information about a dynamic service cell for a data channel, information about a dynamic service cell for a control channel, and information about AP selection in each dynamic service cell and information about multi-cell collaboration scheme.

3. The method according to claim 2, wherein the information about multi-cell collaboration scheme comprises any one or any combination of information about fast switching scheme, information about combined transmit diversity scheme, information about combined transmit receive scheme, information about spatial multiplex scheme and information about cooperative interference management scheme.

4. The method according to claim 3, wherein the information about multi-cell collaboration scheme comprises: information about spatial multiplex scheme, the information about spatial multiplex scheme comprising resource allocation adopted by selected APs in the main cell and resource allocation adopted by the selected APs in the auxiliary cell, or an indication about whether the dynamic service cells adopt the same resource allocation and the resource allocation adopted by the selected APs in the auxiliary cell.

5. The method according to claim 4, wherein the resource allocation adopted by the selected APs in the main cell and the resource allocation adopted by the selected APs in the auxiliary cell are co-encoded or transmitted after compression.

6. The method according to claim 4, wherein the resources adopted by the selected APs in the main cell and the resources adopted by the selected APs in the auxiliary cell are different frequency resources.

7. The method according to claim 3, wherein the information about spatial multiplex scheme further include at least one of a Precoding Matrix Indicator (PMI), a Channel Quality Indicator (CQI) and a Rank Indicator (RI) in the auxiliary cell.

8. The method according to claim 2, further comprising:
notifying the UE of a cell identifier (ID) set of cells that need to be monitored; and
receiving channel quality of all or partial cells corresponding to the cell ID set of the cells that need to be monitored returned by the UE, and according to the channel quality of all or partial cells corresponding to the cell ID set of the cells that need to be monitored, determining the dynamic service cells for the data and/or control channel and determining the dynamic service cells for the control channel and the AP selection of the dynamic service cells.

9. The method according to claim 1, further comprising:
instructing the UE to measure the number of antenna ports in the auxiliary cell; and
receiving the number of the antenna ports in the auxiliary cell returned by the UE;
wherein the scheduling information further comprises an indication of the multi-antenna mode determined according to the number of the antenna ports in the auxiliary cell.

10. The method according to claim 1, wherein the indication of the adopted resources comprises time, frequency, codeword resource and/or transmission power of the adopted resources.

11. The method according to claim 2, wherein the information about the dynamic service cell for the data channel and/or the information about the dynamic service cell for the control channel further comprise a frequency offset of reference signals for the main cell and/or the auxiliary cell.

12. The method according to claim 1, further comprising:
saving at least one of a mapping from AP ID to cell ID, a mapping from AP ID to common reference signal, a mapping from AP ID for transmitting the control channel to the UE, a mapping from AP ID for transmitting the data channel to the UE and a mapping from AP ID for transmitting PUSCH to the UE; and
delivering the mapping relations through an air interface, an X2 interface, or an S1 interface.

13. Communication equipment configured to communicate with a user equipment (UE) served by at least two cells, the communication equipment comprising:
a first processing module, configured to determine a main cell of the UE from the at least two cells;
a second processing module, configured to determine the scheduling information of the main cell and the auxiliary cell that are serving the UE, wherein the scheduling information comprises information about scheduling allocation, and the information about scheduling allocation includes an indication of resources adopted by the UE to send uplink control signals in the main cell and the auxiliary cell; and
a first transmission module, configured to transmit scheduling information of the main cell and an auxiliary cell that are serving the UE in the main cell determined by the first processing module to the UE.

14. The communication equipment according to claim 13, further comprising:
a first notification module, configured to notify the UE of a cell ID set of cells that need to be monitored; and
a first receiving module, configured to receive channel quality of all or partial cells corresponding to the cell ID set returned by the UE;
wherein the second processing module comprises a dynamic service cell determination module, configured to determine dynamic service cells for data and/or control channels for the UE according to the channel quality received by the receiving module; and
an AP selection module, configured to select APs of the dynamic service cells according to the channel quality received by the first receiving module.

15. The communication equipment according to claim 13, further comprising:
a second notification module, configured to instruct the UE to measure the number of antenna ports in the auxiliary cell;
a second receiving module, configured to receive the number of the antenna ports in the auxiliary cell returned by the UE;
wherein the second processing module comprises an antenna mode determination module, configured to determine a multi-antenna mode of the auxiliary cell according to the number of the antenna ports in the auxiliary cell received by the second receiving module.

16. The communication equipment according to claim 13, further comprising a storage unit configured to save at least one of a mapping from AP ID to cell ID, a mapping from AP ID to common reference signal, a mapping from AP ID for transmitting control channel to the UE and/or a mapping from AP ID for transmitting data channel to the UE and a mapping from AP ID for transmitting PUSCH to the UE.

17. A user equipment (UE) being served by at least two cells, the UE comprising:
a first receiving module, configured to receive, in a main cell, scheduling information of the main cell and an auxiliary cell from an Evolved NodeB (eNB), wherein the scheduling information comprises information about scheduling allocation, and the information about scheduling allocation includes an indication of resources adopted by the UE to send uplink control signals in the main cell and the auxiliary cell; and
a transmission module, configured to transmit signaling in control channels of the main cell and the auxiliary cell according to the scheduling information received by the receiving module.

18. The UE according to claim 17, further comprising:
a second receiving module, configured to receive a cell ID set of cells that need to be monitored;
a monitoring module, configured to monitor channel quality of various cells corresponding to the cell ID set; and
a first transmission module, configured to return the channel quality of all or partial cells corresponding to the cell ID set as a feedback;
wherein the first receiving module is configured to receive, in the main cell, the scheduling information of the multiple cells determined according to the returned channel quality of all or partial cells corresponding to the cell ID set.

19. The UE according to claim 17, further comprising:
a third receiving module, configured to receive a notification of measuring the number of antenna ports in the auxiliary cell; a measuring module, configured to measure the number of the antenna ports in the auxiliary cell;

and a second transmission module, configured to report the number of the antenna ports in the auxiliary cell; wherein the first receiving module further comprises a multi-antenna mode receiving module, configured to receive a multi-antenna transmission mode of the auxiliary cell determined according to the data of the antenna ports in the auxiliary cell reported by the second transmission module.

20. A communication method, when at least two cells are serving a user equipment (UE) the method comprising:
receiving, by the UE, in a main cell, scheduling information of the main cell and an auxiliary cell from an Evolved NodeB (eNB), wherein the scheduling information comprises information about scheduling allocation, and the information about scheduling allocation includes an indication of resources adopted by the UE to send uplink control signals in the main cell and the auxiliary cell; and
transmitting signaling in control channels of the main cell and the auxiliary cell according to the scheduling information.

21. The communication method according to claim 20, further comprising:
receiving a cell ID set of cells that need to be monitored, monitoring channel quality of various cells corresponding to the cell ID set, and returning the channel quality of all or partial cells corresponding to the cell ID set;
wherein the receiving the scheduling information of the multiple cells in the main cell comprises receiving, in the main cell, information about dynamic service cells for the data and/or control channels determined according to the returned channel quality of all or partial cells corresponding to the cell ID set, and information about AP selections of the dynamic service cells.

22. The communication method according to claim 21, further comprising:
receiving an notification of measuring the number of antenna ports in the auxiliary cell, measuring the number of the antenna ports in the auxiliary cell, and reporting the number of the antenna ports in the auxiliary cell;
wherein the receiving the scheduling information of the multiple cells in the main cell comprises receiving, in the main cell, a multi-antenna transmission mode of the auxiliary cell determined according to the reported number of the antenna ports in the auxiliary cell.

23. The communication method according to claim 21, wherein, the method further comprises: receiving a mapping table, and acquiring, according to the mapping table, an AP ID for transmitting downlink control channel, an AP ID of each dynamic service cell for transmitting downlink data channel, and an AP ID for transmitting uplink data and/or control channel, and the UE acquires signals from the APs corresponding to the AP IDs.

* * * * *